Figure 2:
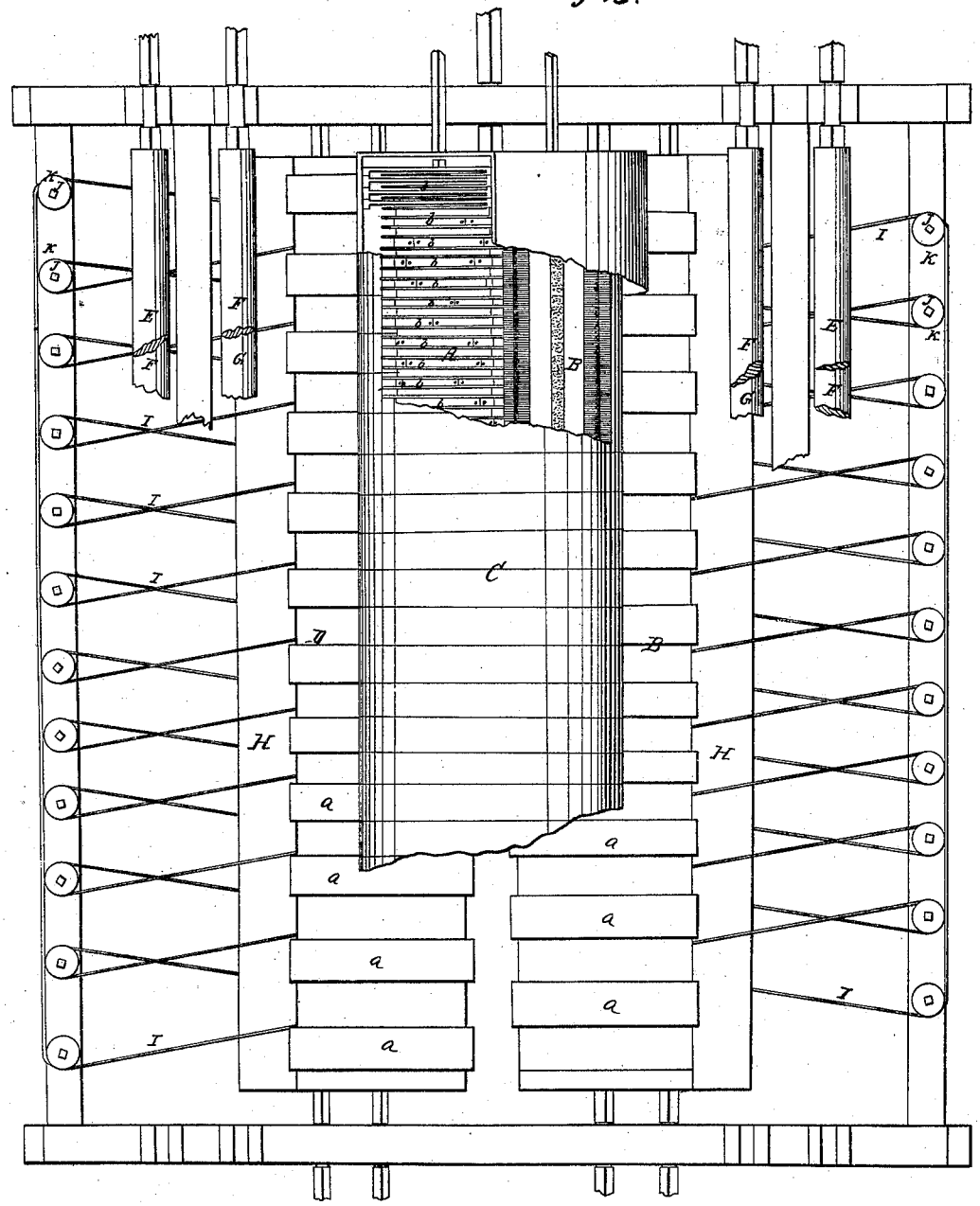

United States Patent Office

PTO - BOYERS, PA Duty Station

MISSING PAGE TEMPORARY NOTICE

PATENT # 3764X FOR ISSUE DATE 9-13-1823 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Drawing Sheet 1 of 2

Data Conversion Operation

Boyers, Pa

3764X

W. Bryant.
Spinning Mach.

Patented Sep. 13, 1823.

N. PETERS, PHOTO-LITHOGRAPHER, WASHINGTON, D. C.